United States Patent
Bengtsson

(10) Patent No.: US 11,897,782 B2
(45) Date of Patent: Feb. 13, 2024

(54) METHOD OF COMBUSTING ALUMINIUM AND SYSTEM THEREFOR

(71) Applicant: SAAB AB, Linköping (SE)

(72) Inventor: Ulf Bengtsson, Lagos (PT)

(73) Assignee: SAAB AB, Linköping (SE)

( * ) Notice: Subject to any disclaimer, the term of this patent is extended or adjusted under 35 U.S.C. 154(b) by 949 days.

(21) Appl. No.: 16/641,688

(22) PCT Filed: Aug. 20, 2018

(86) PCT No.: PCT/SE2018/050840
§ 371 (c)(1),
(2) Date: Feb. 25, 2020

(87) PCT Pub. No.: WO2019/039991
PCT Pub. Date: Feb. 28, 2019

(65) Prior Publication Data
US 2020/0223709 A1    Jul. 16, 2020

(30) Foreign Application Priority Data
Aug. 25, 2017 (SE) .................... 1730226-6

(51) Int. Cl.
*C01F 7/30* (2022.01)
*F23B 10/02* (2011.01)
(Continued)

(52) U.S. Cl.
CPC .................. *C01F 7/30* (2013.01); *C01B 3/10* (2013.01); *F23B 10/02* (2013.01); *F42B 19/12* (2013.01);
(Continued)

(58) Field of Classification Search
CPC .... C01F 7/30; C01B 3/10; F23B 10/02; F23B 2900/00003; Y02E 60/36
See application file for complete search history.

(56) References Cited

U.S. PATENT DOCUMENTS

| | | |
|---|---|---|
| 2,289,682 A | 7/1942 | Raser |
| 2,744,742 A | 5/1956 | Lord |
| 3,991,559 A | 11/1976 | Oda et al. |

(Continued)

FOREIGN PATENT DOCUMENTS

| | | |
|---|---|---|
| DE | 2326801 A1 | 12/1974 |
| EP | 308933 A1 | 3/1989 |

(Continued)

OTHER PUBLICATIONS

Paulus Bucher (Flame Structure Measurements and Modeling Analysis of Isolated Aluminum Particle Combustion, Princeton University, 1998) (Year: 1998).*

(Continued)

*Primary Examiner* — Colin W. Slifka
*Assistant Examiner* — Logan Edward Laclair
(74) *Attorney, Agent, or Firm* — Sage Patent Group

(57) ABSTRACT

A system and method of combusting aluminium comprising i) feeding aluminium wire to a substantially oxygen-free furnace comprising a. a first low-temperature section in communication with b. a second high-temperature section ii) forming aluminium particles with an average particle size ranging from 1 μm to 200 μm from said aluminium wire in said first section iii) feeding water and/or steam to said first and/or second section to provide an oxidizer for oxidizing said aluminium particles in the second section iv) conveying aluminium particles from the first section to the second section v) oxidizing said aluminium particles in the presence of steam in said second section.

15 Claims, 9 Drawing Sheets

(51) Int. Cl.
*F42B 19/12* (2006.01)
*C01B 3/10* (2006.01)

(52) U.S. Cl.
CPC ..... *F23B 2900/00003* (2013.01); *Y02E 60/36* (2013.01)

(56) References Cited

U.S. PATENT DOCUMENTS

| | | |
|---|---|---|
| 3,993,431 A | 11/1976 | Oda et al. |
| 4,374,075 A | 2/1983 | Yolton et al. |
| 7,900,453 B1 | 3/2011 | Lynch et al. |
| 7,963,115 B1 | 6/2011 | Sondergaard et al. |
| 9,241,396 B2 | 1/2016 | Foret |
| 2009/0126608 A1* | 5/2009 | Borissov ............... F23B 7/00 110/106 |
| 2011/0252800 A1 | 10/2011 | Cawley et al. |

FOREIGN PATENT DOCUMENTS

| | | |
|---|---|---|
| EP | 1834699 A1 | 9/2007 |
| JP | 2009074718 A | 4/2009 |
| RU | 2428371 C1 | 9/2011 |

OTHER PUBLICATIONS

International Search Report and Written Opinion in corresponding International Application No. PCT/SE2018/050840 dated Sep. 13, 2018 (9 pages).

Extended European Search Report dated Apr. 30, 2021 for European Patent Application No. 18848196.4, 5 pages.

* cited by examiner

METHOD OF COMBUSTING ALUMINIUM AND SYSTEM THEREFOR

CROSS-REFERENCE TO RELATED APPLICATIONS

This application is a U.S. National Stage application of PCT/SE2018/050840, filed Aug. 20, 2018 and published on Feb. 28, 2019 as WO/2019/039991, which claims the benefit of Swedish Patent Application No. 1730226-6, filed Aug. 25, 2017, all of which are hereby incorporated by reference in their entireties.

The present invention relates to a system and a method of combusting aluminium. The invention also relates to the use of the system for powering underwater vehicles such as torpedoes, submarines and unmanned underwater vehicles such as remotely operated underwater vehicles or stationary remote systems on the seafloor.

BACKGROUND OF THE INVENTION

It is known in the art to combust aluminium in oxygen environment to produce energy wherein aluminium is oxidized to alumina according to the following formula:

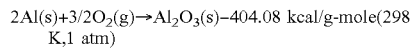

$$2Al(s) + 3/2 O_2(g) \rightarrow Al_2O_3(s) - 404.08 \text{ kcal/g-mole}(298 \text{ K}, 1 \text{ atm})$$

It is also known that oxidation of aluminium with steam may be performed according to the following formula:

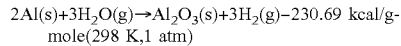

$$2Al(s) + 3H_2O(g) \rightarrow Al_2O_3(s) + 3H_2(g) - 230.69 \text{ kcal/g-mole}(298 \text{ K}, 1 \text{ atm})$$

However, difficulties may arise due to various process conditions when oxidizing aluminium in steam. As an example, the surface area of the aluminium particles reacted must be within a certain range to enable efficient oxidation thereof. Also, since aluminium spontaneously forms a passive protecting oxide layer around its surface, such layer must first be broken to combust aluminium metal protected thereunder. Melting the surrounding aluminium oxide layer to oxidize metallic aluminium inside the aluminium oxide surface may require a temperature above 2100 K.

The present invention intends to provide a more energy-efficient and safe method of combusting aluminium. Moreover, the present invention intends to provide a propellant with high energy density, especially for underwater propulsion of e.g. submarines or torpedoes.

The invention also intends to provide a sustainable combustion process which does not need continuous heating during the entire oxidation process. The invention also intends to provide a method enabling simple storage of aluminium, especially in confined spaces, without extraordinary measures requiring complex storing means. The invention also intends to enable aluminium combustion on demand wherein aluminium raw material is used only to the extent needed. The invention also intends to provide a stealthy method of combusting aluminium in silence or at low decibel levels.

THE INVENTION

The present invention relates to a method of combusting aluminium comprising
i) feeding aluminium wire to a substantially oxygen-free furnace comprising
  a. a first low-temperature section in communication with
  b. a second high-temperature section
ii) forming aluminium particles with an average particle size ranging from 1 μm to 200 μm from said aluminium wire in said first section
iii) feeding water and/or steam to said first and/or second section to provide an oxidizer for oxidizing said aluminium particles in the second section
iv) conveying aluminium particles from the first section to the second section
v) oxidizing said aluminium particles in the presence of steam in said second section.

According to one embodiment, the temperature in the first low-temperature section ranges from 300 to 1000, preferably from 300 to 800, and most preferably from 300 to 700° C.

According to one embodiment, the temperature in the second high-temperature section ranges from 1300 to 3500, such as 1500 to 3000, preferably from 1600 to 2200, most preferably from 1600 to 2000° C.

According to one embodiment, the temperature in the high-temperature section, at least when igniting aluminium, is up to about 3500° C., at least at or in the vicinity of heating means such as an arc, e.g. a plasma arc. The temperature at or in the flame of the arc where combustion may occur may thus amount to up to about 3500° C.

In the context of temperature ranges or specific temperature levels defined herein, the temperature refers to an average temperature in the specified section or part of a section such as the temperature in the flame in the second high-temperature section. Temperatures may locally in the sections differ from the defined temperature ranges and temperature gradients may exist between inter alia the low-temperature section and the high-temperature section. The temperature in the high-temperature section may for example differ considerably between the flame, the furnace wall and the space in between.

Preferably, the temperature of the flame igniting aluminium ranges from 1500 to 3000° C., most preferably from 2000 to 3000° C. The temperature in the furnace is preferably measured by an IR detector such as a TEMPSENS AST A250 PLTL in a range from 350° C. to 3000° C.

Preferably, the aluminium wire has a cross sectional area ranging from 0.1 to 50, e.g. from 0.25 to 40 or most preferably from 0.25 to 20 mm².

By the term "wire" is meant any profile which may be supplied having a small diameter relative to its length. By wire is included e.g. rods, sticks or the like with a cross sectional area as defined herein.

The furnace employed may be any suitable furnace with sufficient capacity to combust aluminium depending on the degree of supply thereof. Preferably, the furnace has a power ranging from 20 to 2000, more preferably from 20 to 700, even more preferably from 20 to 500 kW, or most preferably from 20 to 100 kW such as for example from 25 to 60 kW.

If oxygen is added to the high-temperature section of the furnace, hydrogen gas may be combusted therein. No or substantially no oxygen will be present in the low-temperature section. Preferably, both the low-temperature section and the high-temperature section of the furnace are free from oxygen gas ($O_2$).

According to one embodiment, no or essentially no hydrogen is present in the furnace to delimit gas bubbles in exhaust streams of water from the furnace.

According to one embodiment, the aluminium wire is transformed into particles by means of
  a) milling
  b) ultrasonic radiation c) intermixing steam and aluminium in a convergent-divergent nozzle; or
d) rotary disc.

When producing aluminium particles, any suitable method known in the art may be used. According to one embodiment, formation of aluminium particles, in the art often referred to as atomization, is performed by means of a thermal spraying nozzle device as further disclosed in EP 1,834,699. Ultrasonic radiation is further disclosed in e.g. EP 308, 933. Aluminium particles may also be formed by use of a plasma arc gas jet as disclosed in U.S. Pat. No. 4,374,075.

In order to provide sufficient heat to transform aluminium wire to particles, heat is transferred from the second high-temperature section to the first low-temperature section. The temperature in the low-temperature section must be maintained within a certain range to facilitate particle formation and may not exceed temperature levels impeding particle formation. This may be controlled by means of a suitable heating barrier as further described herein separating and controlling heat and mass transfer from the low-temperature and high-temperature sections. Also further means to heat aluminium wire to cause it to melt in the first section may be used such as an arc, e.g. a plasma arc positioned in the vicinity of the aluminium wire, e.g. for melting aluminium in procedures involving ultrasonic radiation or rotary disc treatments.

According to one embodiment, the average particle diameter of the aluminium particles which herein is defined as the average particle diameter by number, ranges from 1 to 150, for example 5 to 100, and most preferably from 10 to 70 μm.

According to one embodiment, the aluminium wire is supplied to said first section at a speed ranging from 0.1 to 300, preferably from 10 to 150 g aluminium/second. According to one embodiment, the aluminium wire is supplied to said first section at a speed ranging from about 0.1 to 10 g aluminium/second.

According to one embodiment, the molar ratio of water to aluminium supplied to the furnace per time unit ranges from 3:1 to 1:3, preferably from 3:1 to 1:1, more preferably from 2:1 to 1.1, or most preferably from 1.2:1 to 1.1:1.

According to one embodiment, the high-temperature section of the furnace is preheated to a temperature ranging from 1600 to 3500, e.g. 1600 to 2300° C. before oxidation of aluminium particles is initiated.

According to one embodiment, an arc such as a plasma arc controls the temperature in the furnace. For example, an arc as further disclosed in U.S. Pat. No. 9,241,396 may be used to ignite and combust aluminium. Preferably, the furnace is preheated by an arc, preferably a plasma arc. According to one embodiment, the plasma arc is switched off if the temperature is maintained within a predetermined range at which continuous combustion is enabled.

Preferably, a flame holder is arranged in the furnace to reduce the gas flow and provide a moderate swirl of gas where the combustion occurs. A heating barrier as defined herein also reduces the flow of aluminium particles and steam. As aluminium particles and steam are transferred from the low-temperature section to the high-temperature section via cross sectional area not covered by the heating barrier between the first and second sections, the flow is initially at a relatively high speed which subsequently after having passed the barrier slows down in speed whereupon it is heated by the flame and aluminium particles are eventually combusted.

Preferably, water and/or steam is fed to the furnace at a temperature ranging from 250 to 1100° C., preferably from 900 to 1100° C.

According to one embodiment, a boiler may be provided supplying superheated steam to the first low-temperature section, in particular by injecting such superheated steam into a nozzle, preferably a convergent-divergent nozzle such as a de Laval nozzle in which steam and melted aluminium are mixed and through which nozzle aluminium particles are ejected.

According to one embodiment, the pressure in the furnace ranges from 0.1 to 30 MPa, preferably from 1 to 30 MPa, and most preferably at 5 MPa to 30 MPa such as from 10 MPa to 30 MPa.

According to one embodiment, the furnace is equipped with cooling means such as a jacket surrounding the walls of the furnace. Thereby, the oxidation temperature may be monitored within a predetermined temperature range while protecting the inner walls of the furnace from overheating. The inner walls may be lined with graphite to increase the resistance thereof. Ballast water may be circulated through such cooling means.

According to one embodiment, the retention time of aluminium in the furnace, e.g. particles having a size of about 50 μm and subjected to a pressure of 1 atm. before oxidation may range from 0.1 to 10 ms, preferably from 2 to 5 ms. The retention time may be considerably higher at higher pressure.

The invention also relates to a system for oxidizing aluminium comprising a substantially oxygen-free furnace comprising
  a. a first low-temperature section adapted for maintaining a temperature ranging from 300 to 1000° C. in communication with
  b. a second high-temperature section adapted for oxidizing aluminium at a temperature ranging from 1300 to 3500° C.
  c. means for feeding aluminium wire to said first section at a controlled speed
  d. inlet for receiving aluminium wire to said first section
  e. means for forming aluminium particles ranging from 1 to 200 μm from said aluminium wire in said first section
  f. means for feeding water and/or steam to said first and/or second section of the furnace
  g. inlet for receiving water and/or steam to the furnace
  h. means for oxidizing the aluminium particles in the presence of steam in the high-temperature section of the furnace to provide aluminium oxide.

By the term "oxygen-free" as used herein is meant free of oxygen, i.e. that no oxygen gas ($O_2$) is present.

Preferably, a heating barrier is provided between the low-temperature section and the high-temperature section to control heat transfer and mass transfer between the sections. Depending on the temperature ratio of the first section to the second section, the heating barrier can be designed to delimit the temperature range in the respective sections in a desired manner. As an example, the heating barrier may cover 80 to 95%, preferably 90 to 95% of the cross sectional area at which the respective sections are divided while allowing controlled heat and mass transfer through the remaining open cross sectional area available for such transfer, i.e. from 5 to 20% or 5 to 10%. Such barrier may thus allow for a controlled heat transfer from the high-temperature section to the low-temperature section and mass transfer from the low-temperature section to the high-temperature section.

The invention also relates to the use of energy obtained from the system in a stirling engine, steam engine, or a gas engine.

According to one embodiment, the system comprises means for transferring heat in said system to an underwater vehicle.

DETAILED DESCRIPTION OF THE INVENTION

Figure 1:
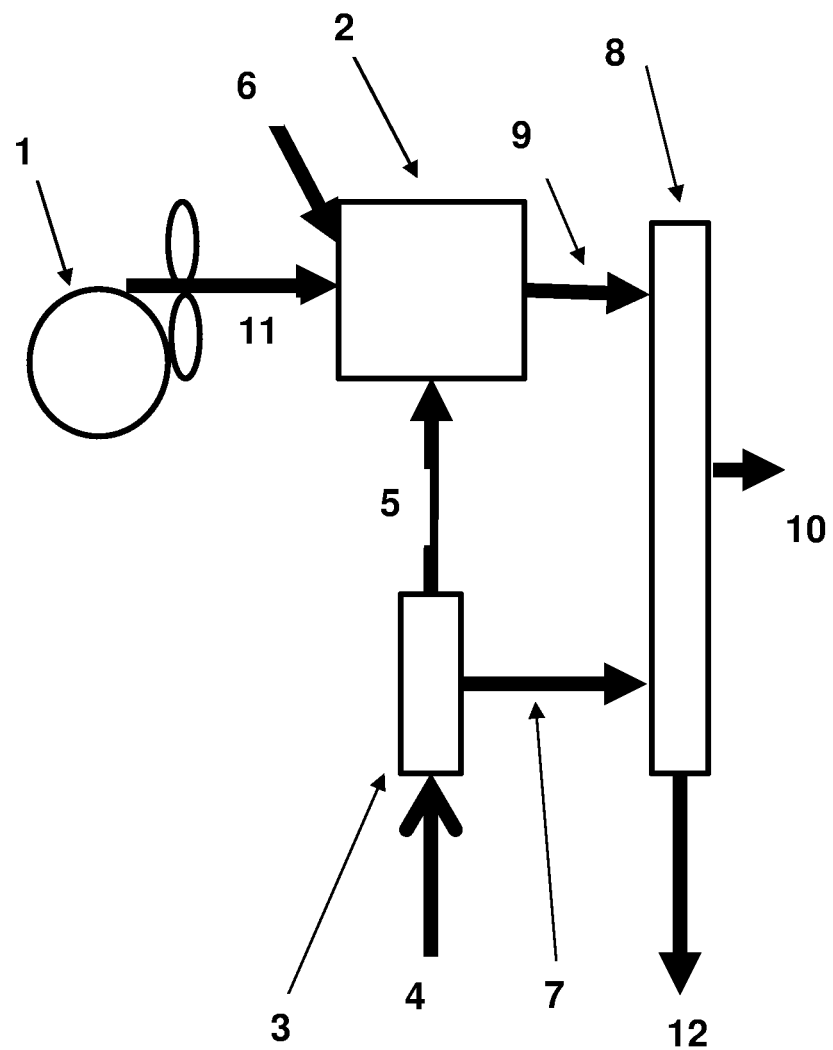
FIG. 1 shows a system for feeding and converting aluminium wire into μm-sized aluminium particles in a furnace for subsequent combustion.

FIG. 1 shows a storage container 1 for aluminium wire 11. The aluminium wire 11, which may be rolled up on a reel, is preferably stored in an inert environment without presence of oxygen. Aluminium wire may also be stored in an oxygen environment since the wire only exposes a small portion of its metallic surface whereby the formed aluminium oxide layer will be very small based on the weight of the wire. Preferably, aluminium is stored in an oxygen-free environment. Aluminium may also be stored in other forms such as e.g. sticks or rods having a corresponding cross sectional area as defined herein. The wire 11 may have any suitable cross section such as circular or square-shaped. The wire 11 may be fed from the storage container 1 at ambient temperature at a controlled rate as defined herein to a furnace where the temperature ranges from 300 to 3500° C. as further explained herein. Preferably, aluminium passes the first low-temperature section (not shown in FIG. 1) wherein the temperature ranges from 300 to 1000° C. before it reaches the high-temperature section (towards the right-hand side in the furnace 2) wherein the temperature ranges from 1300 to 3500° C. The wire 11 may before entering the furnace 2 be pretreated in a cleaning and/or stripping stage (not shown) to remove possible aluminium oxide formed on the surface of the wire 11. The wire 11 is transformed in the low-temperature section to μm-sized aluminium particles with an average particle size ranging preferably from 10 to 90 μm. Formation of μm-sized aluminium particles may be performed in a number of ways as will be shown in FIGS. 2 to 5 below. The particles are subsequently conveyed to the high-temperature section of the furnace 2. Ambient water and/or steam is supplied via lines 4, 5 by means of water pumps 3 to the furnace 2. Water and/or steam preferably are supplied to inlets positioned such that the steam may carry and transport formed aluminium particles in the furnace from the low-temperature section to the high-temperature section without any further means safeguarding such transfer. This may for example be effected by injecting steam upstream from the point(s) of formation of aluminium particles. Ambient water may also be pumped and used as cooling water via line 7 to engine 8 to prevent overheating. Heat 9 produced in the furnace 2 entering engine 8 is transformed to electric power 12. Condensed water 10 withdrawn from engine 8 may be recirculated to water pumps 3. According to one embodiment, oxygen is added to the second high-temperature section of furnace 2 via line 6. Preferably, oxygen is added in an amount of 1.5 moles/2 moles of aluminium. Oxygen combusts hydrogen formed as a by-product during oxidation of aluminium to aluminium oxide in the steam environment. Oxygen injected into the high-temperature section will not diffuse into the low-temperature section as mass flows of steam and aluminium particles continuously enter the high-temperature section. If it is desired to accelerate diffusion of steam and aluminium into the high-temperature section, any such means known in the art may be used. Combustion of hydrogen generates some additional heat which is transformed to electric power while eliminating hydrogen. Elimination of the hydrogen exhaust gases may be important in certain applications, in particular in underwater vehicles which otherwise may be detected from the outside. According to one embodiment, oxygen may be stored in liquid or gas phase, preferably gas phase, at a suitable location relative to the furnace 2 for supply thereto. According to one embodiment, hydrogen peroxide may be stored and converted to oxygen on demand to provide for hydrogen oxidation. As hydrogen peroxide is catalytically reacted, steam and oxygen are produced. Two moles of peroxide is required for each mole of oxygen produced.

Figure 2:
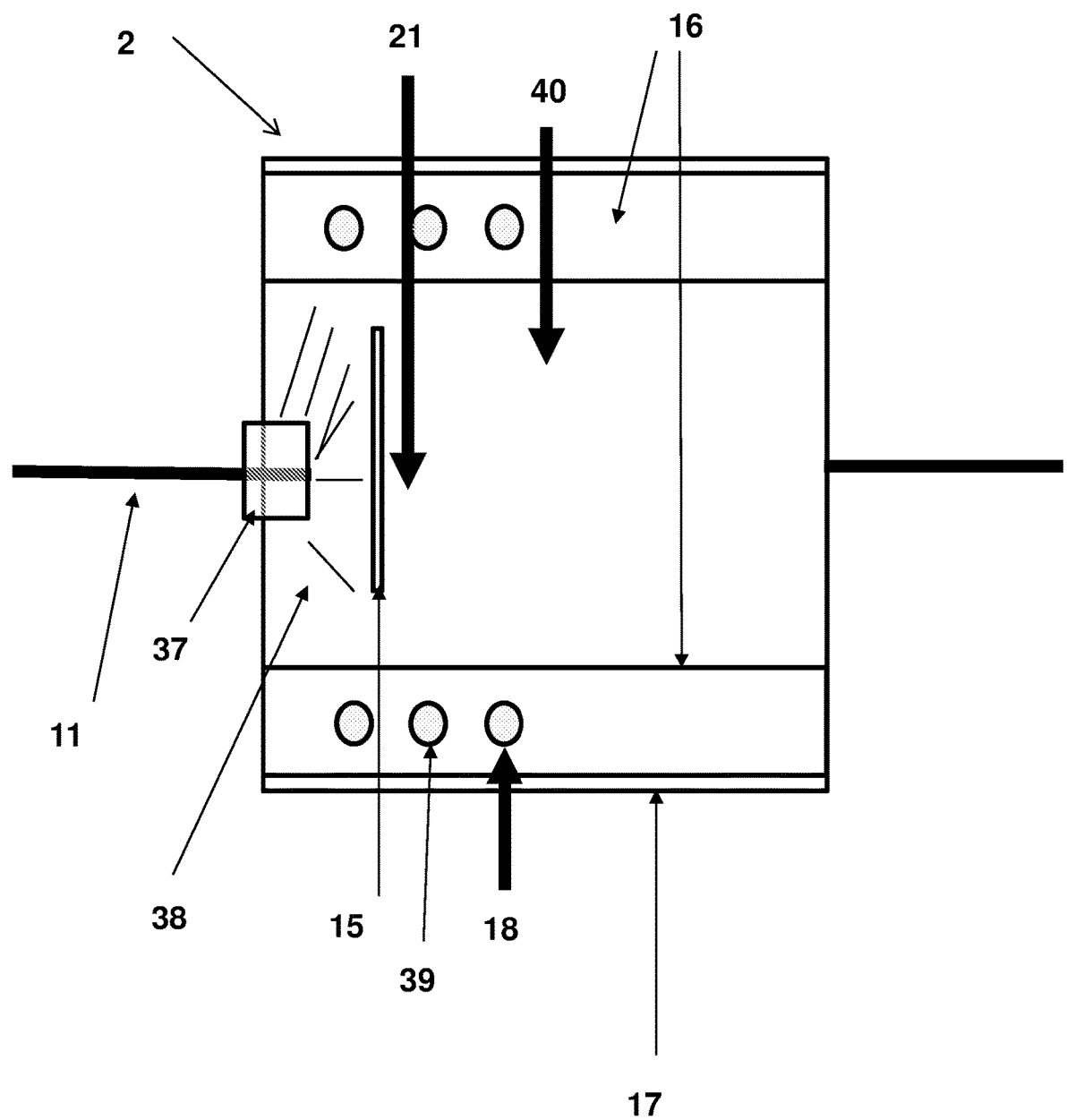
FIG. 2 shows a system comprising a nozzle through which aluminium and steam are supplied to provide aluminium particles which subsequently are conveyed to the high-temperature section of the furnace.

FIG. 2 shows a system in which aluminium wire 11 and steam, preferably superheated steam, enter a nozzle 37, preferably a convergent-divergent nozzle such as a de Laval nozzle. The entering steam may be preheated and supplied as a superheated steam at about 1100° C. to the nozzle 37. Preheating may be effected by passing water 18 through a coil 39 (indicated by circular pipes in the insulation 16) integrated in the insulating wall of the furnace. Superheated steam may thus be supplied to nozzle 37. Heat originating from the up-heated walls of the furnace 2 may thus be used as a heat exchanger. The steam melts the aluminium in the nozzle 37 which is subsequently ejected from the nozzle 37 as a spray 38 consisting of μm-sized solid aluminium particles carried and transported by the steam stream towards the high-temperature section, i.e. at the right-hand side of heating barrier 15. The barrier 15 is provided to prevent overheating of nozzle 37 from heat originating from the high-temperature section at a plasma arc 21. Ballast water may be added via line 40 to the high-temperature section to prevent overheating of the engine connected to the system. The furnace 2 is preferably provided with surrounding insulation 16, e.g. a refractory material resisting temperatures up to about 2000° C. minimizing heat losses in the furnace 2. The furnace 2 is enclosed inside a pressure vessel 17 resisting considerable pressure differences between the outside and inside thereof, e.g. between pressure at exterior ambient water and internal pressure. Such pressure difference may in an underwater vehicle correspond to a depth of 3000 m, i.e. an approximate pressure difference of 30 MPa.

Figure 3:
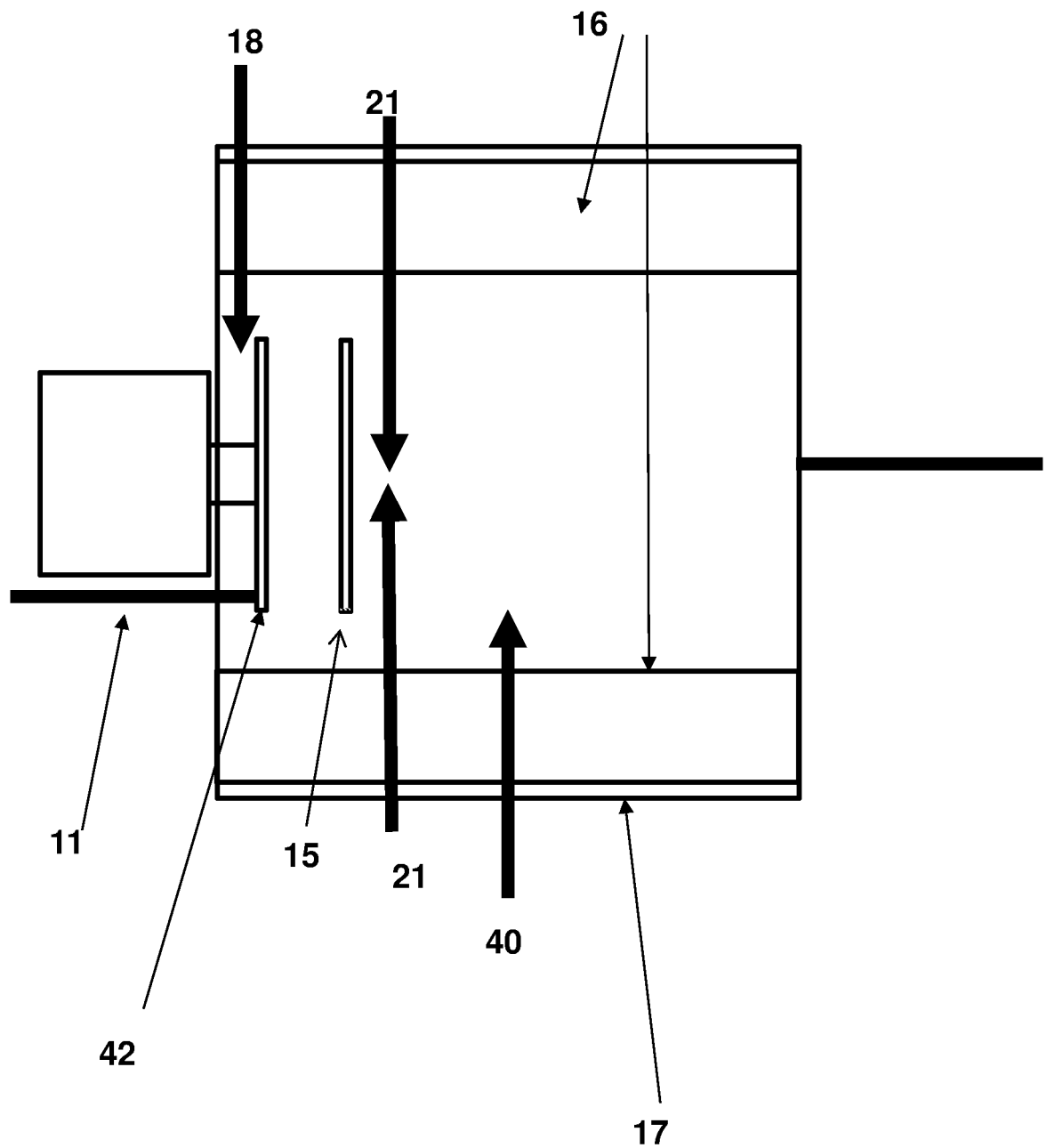
FIG. 3 shows a system in which aluminium wire is fed to a rotary disc exposed to heat melting the aluminium and forming aluminium particles conveyed to the second high-temperature section.

FIG. 3 shows a system in which aluminium wire 11 is supplied to a rotary disc 42 in the low-temperature section where the temperature preferably is at 800° C. A disc motor 41 is powering a rotating spindle on which the rotary disc 42 is mounted. The rotary disc 42 may also serve as a heating barrier. Also, a separate heating barrier may be provided separating the first low-temperature section where the rotary disc 42 is positioned and the high-temperature section. Water for combusting aluminium may be provided via line 18 to the low-temperature section which also transfers the formed aluminium particles to the high-temperature section. A plasma arc 21 provides heat to the high-temperature section. As a result of the aluminium wire being subjected to melting at the rotary disc 42, aluminium particles are formed and conveyed by steam currents to the high-temperature section for combustion.

Figure 4:
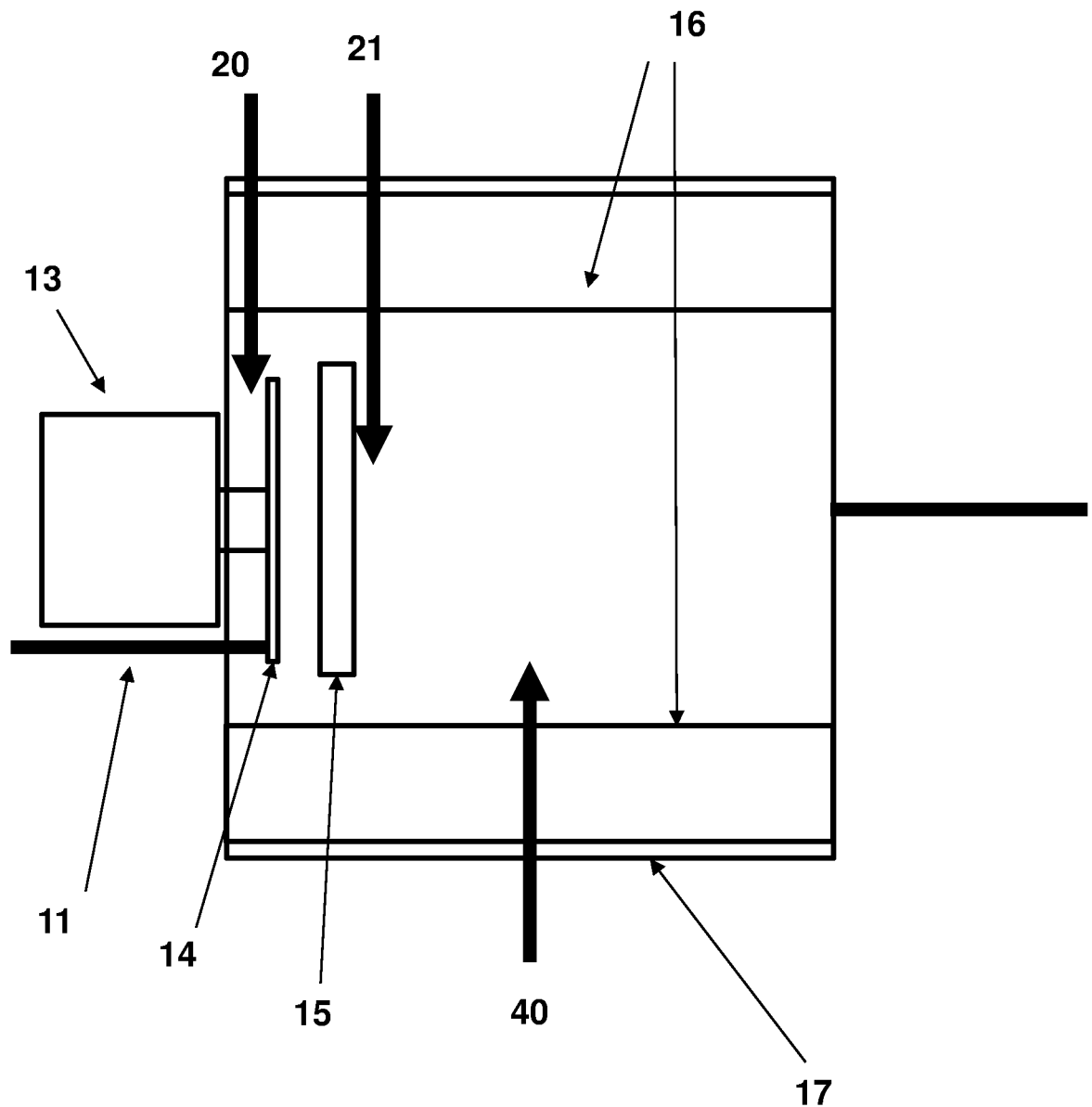
FIG. 4 shows a system for milling aluminium wire into μm-sized particles which subsequently are conveyed to the high-temperature section for combustion.

FIG. 4 shows a schematic system wherein milling means 13 comprising a milling wheel 14, a milling motor and a spindle rotating the milling wheel 14 arranged at the inlet to the low-temperature section of furnace 2. The milling wheel 14 transforms aluminium wire 11 to aluminium particles. The rotation of the wheel may range from e.g. 10000 to 200000, preferably from 50000 to 100000 rpm, e.g. when employing a furnace with a power of about 35 kW. A heating barrier 15 is provided to reduce heat radiation from the plasma arc 21 and flame in the high-temperature section of the furnace 2 into the low-temperature section and to safeguard that no undesired melting or oxidation of formed aluminium particles occur in the low-temperature section resulting in clogging of aluminium on the furnace wall. The temperature at the milling wheel 14 should preferably be about 300° C. Oxidation of aluminium can thus be confined to the high-temperature section of the furnace 2 after aluminium particles have been conveyed thereto. The furnace 2 is preferably provided with surrounding insulation 16, e.g. a refractory material resisting temperatures up to about 2000° C. minimizing heat losses in the furnace 2. The furnace 2 is designed as in FIG. 2 above enclosed in pressure vessel 17 and provided with line 40 for ballast water to prevent overheating of the engine. Water may be supplied to the furnace 2 via line 20 to the first section. Alternatively, the embodiment of FIG. 4 may also be operated without a separate heating barrier 15 whereby heat from the plasma arc 21 during start-up or flame may be used to melt aluminium prior to mechanical treatment with the rotary disc. During start-up, the furnace 2 needs to be preheated in order to efficiently oxidize aluminium at a sufficiently high temperature whereby aluminium particles are oxidized in the presence of steam in the furnace 2.

Figure 5:
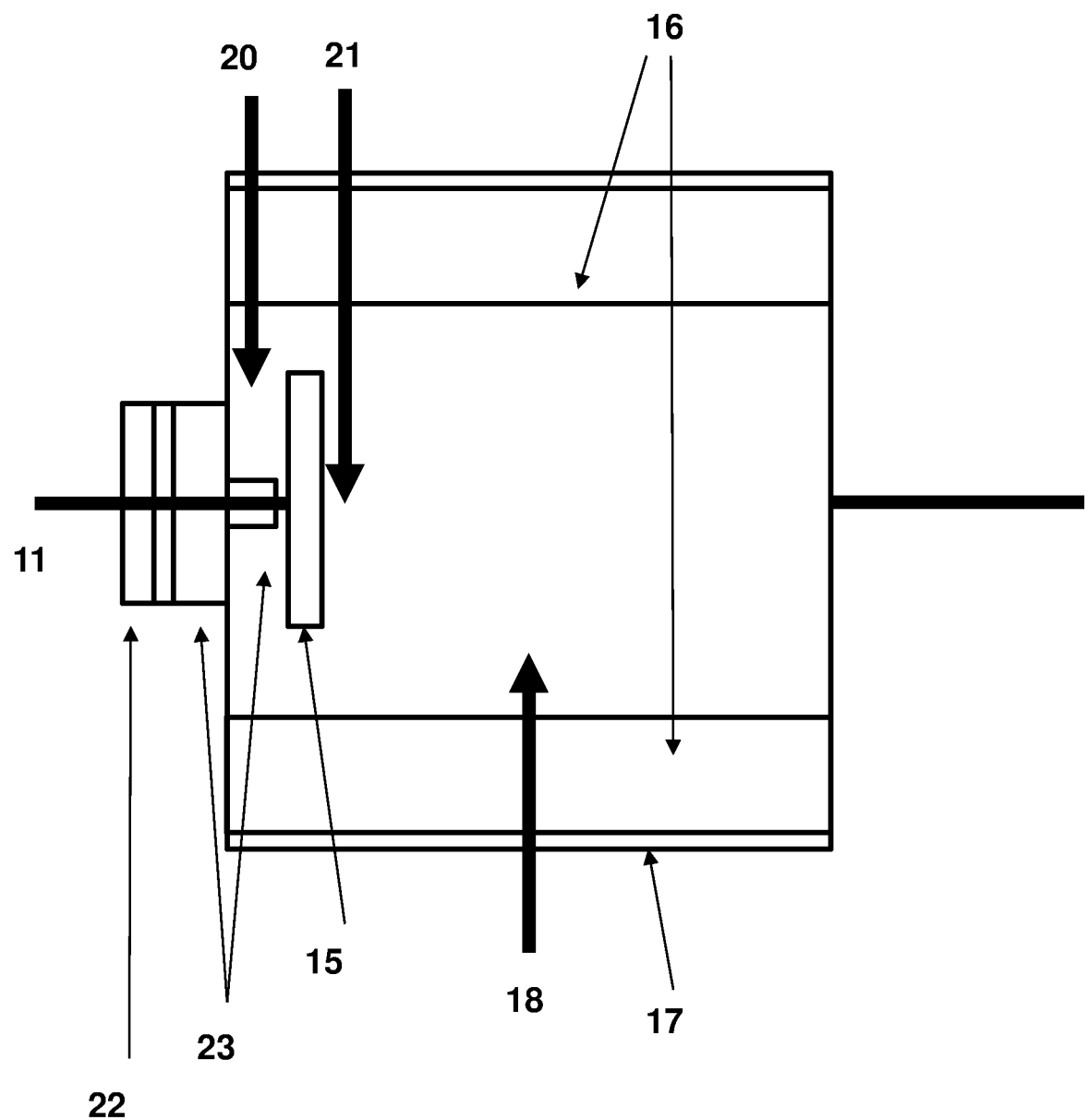
FIG. 5 shows a system comprising ultrasonic transducers sending out ultrasonic energy to aluminium in the first section resulting in formation of μm-sized aluminium particles to be combusted in the high-temperature section of the furnace.

FIG. 5 shows a system provided with an ultrasound device 22 radiating ultrasonic energy on the aluminium wire 11 which is simultaneously subjected to heat to a temperature of 800° C. from heating barrier 15 whereby aluminium is melted and transformed to aluminium particles. The furnace insulation 16, pressure vessel 17, water lines 18 and 20, and plasma arc 21 are as described in FIGS. 3 and 4. The ultrasonic device 22 may be arranged such that aluminium wire 11 fed to the low-temperature section on the left-hand side of the heating barrier 15 passes the device 22 provided with an ultrasonic horn 23 where particle formation occurs. The ultrasonic device 22 may comprise a transducer backing arranged coaxially around a heat-insulated transducer tension bolt. The bolt may be provided with a central bore through which aluminium wire may be fed preceding the particle formation at the horn 23. A piezo ceramic transducer may be provided at the inlet to a furnace 2 to which the formed aluminium particles subsequently are supplied and mixed with supplied steam. The ultrasonic radiation sent out from the device 22 typically has a frequency ranging from 20 to 40 kHz. The heating barrier 15 transferring heat to the aluminium is positioned between the high-temperature section of furnace 2 and the ultrasonic horn 23 in the first low-temperature section to prevent aluminium in the low-temperature section from melting resulting in subsequent clogging of the walls of the low-temperature section. The walls of the furnace may also be used to transfer heat to the aluminium wire. According to one embodiment, at least one cavity in the wall is provided through which heat is supplied. The wall may transfer about 1 kW to the wire in a 35 kW furnace. The barrier 15 also acts as an ultrasonic baffle creating powerful reciprocal radial flow of ultrasonic waves along the heating barrier towards the surrounding walls of the section between the horn 23 and the heating barrier 15. Such radial flow increases the pulverization of aluminium into particles.

Figure 6:
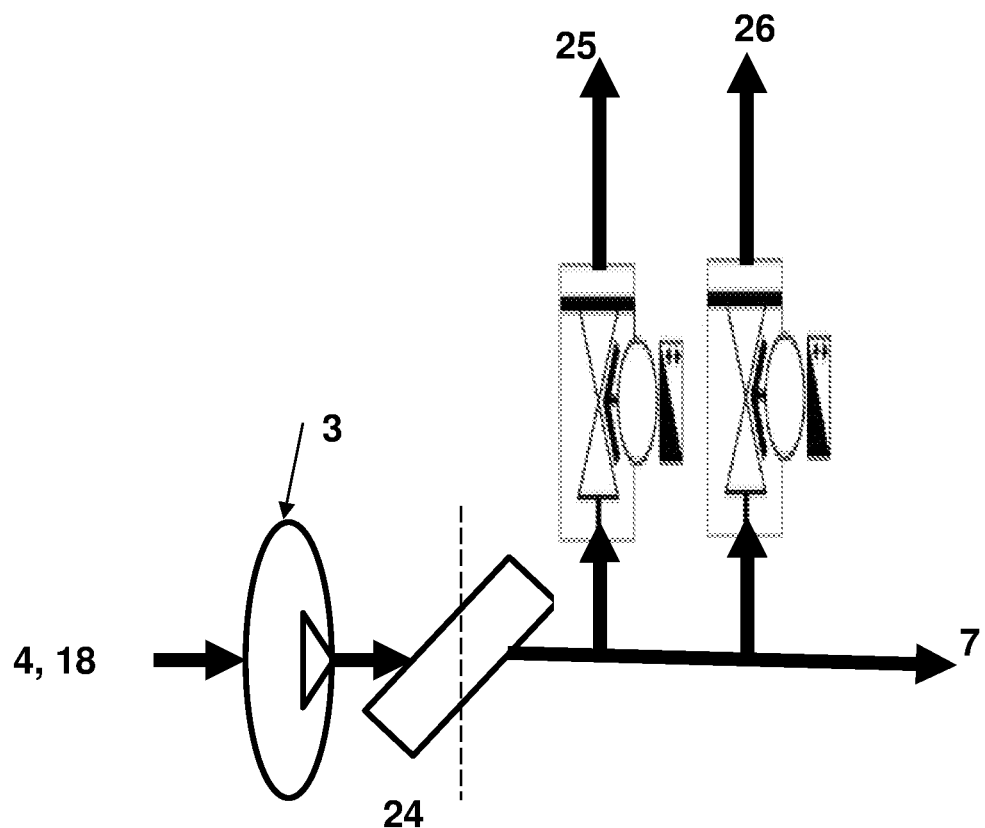
FIG. 6 shows a water pump feeding water to the furnace.

FIG. 6 illustrates raw water pumps 3 to which ambient water 4, 18 is pumped and fed to the first low-temperature section of the furnace 2. Pumps 3 may pressurize water and provide cooling water via line 7 for temperature control and prevent overheating of engines connected to the system. A raw water filter 24 is arranged to prevent clogging of combustion control valve 25 and ballast water control valve 26. Combustion control valve 25 monitors a mass flow rate of water to provide a stoichiometrically optimal weight ratio of steam to aluminium in the furnace 2. Ballast water control valve 26 monitors cooling water supplied via line 7 supplied to the engine to prevent overheating thereof.

Figure 7:
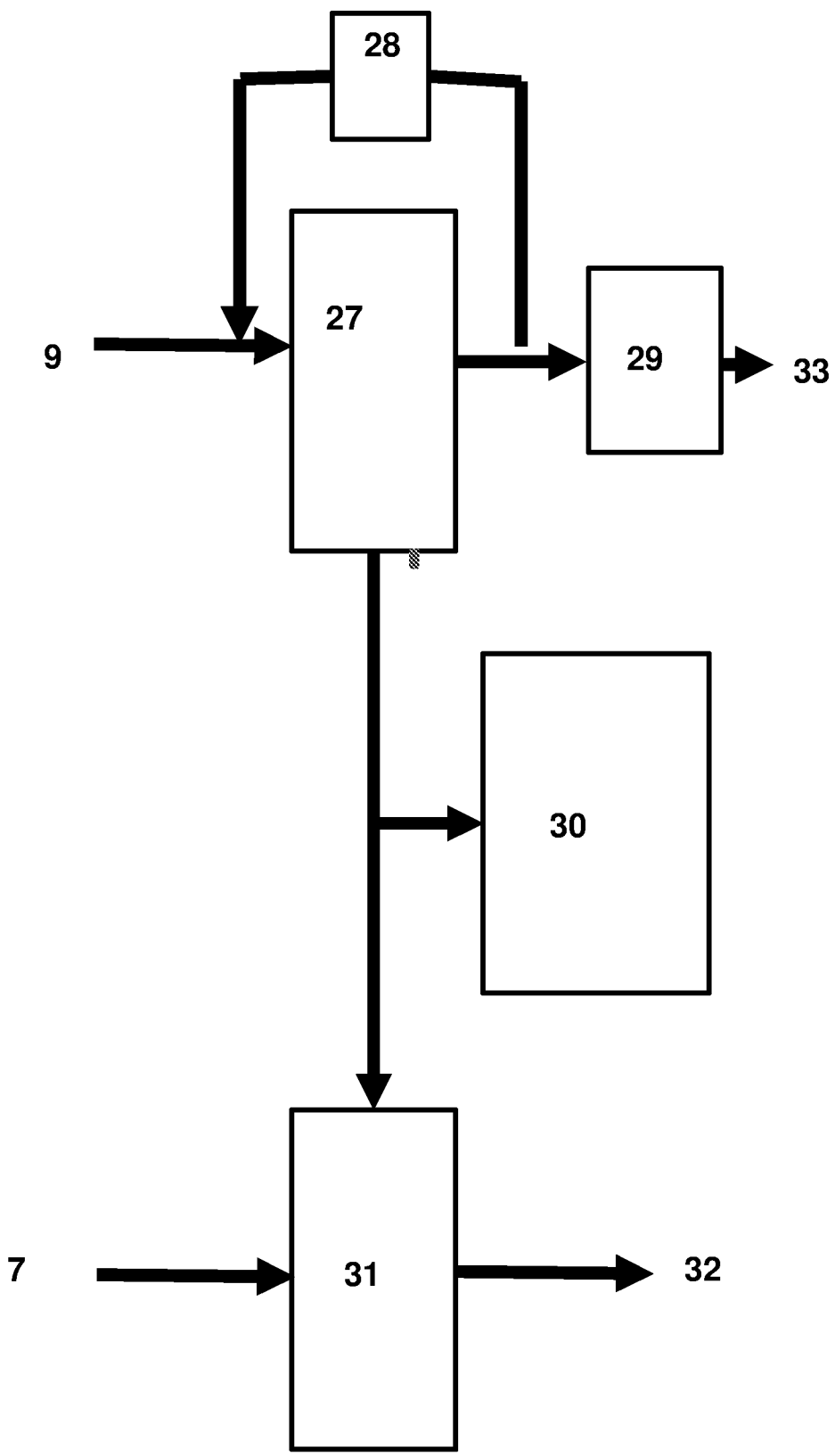
FIG. 7 shows a stirling engine to which exhaust gases from the furnace are supplied.

FIG. 7 illustrates a stirling engine. Exhaust gas 9 exiting furnace 2 enters a heater 27 (pressurized heater cap). A fan 28 drives the exhaust gas recirculation (EGR) which allows an exhaust gas temperature from the furnace 2 up to above 2000° C. Control valves 25 and 26 are provided as further described in FIG. 6. A check valve 29 is provided to prevent ambient water from flooding the furnace 2 while allowing water to exit at outlet 33. A cooler 31 (pressurized cooler cap) is provided through which cooling water via line 7 may enter. Water may be withdrawn at line 32. A generator/ECU 30 converts engine shaft energy to electric energy. The generator 30 may store energy for a short period of high output and for starting. The generator 30 also provides control and power to the arc heater, aluminium wire processing, pumps 3, valves 25, 26 and the EGR fan 28. An EGR may also be omitted provided the metal surfaces of the heater are coated with ceramics or other material resisting temperatures in the same range.

Figure 8:
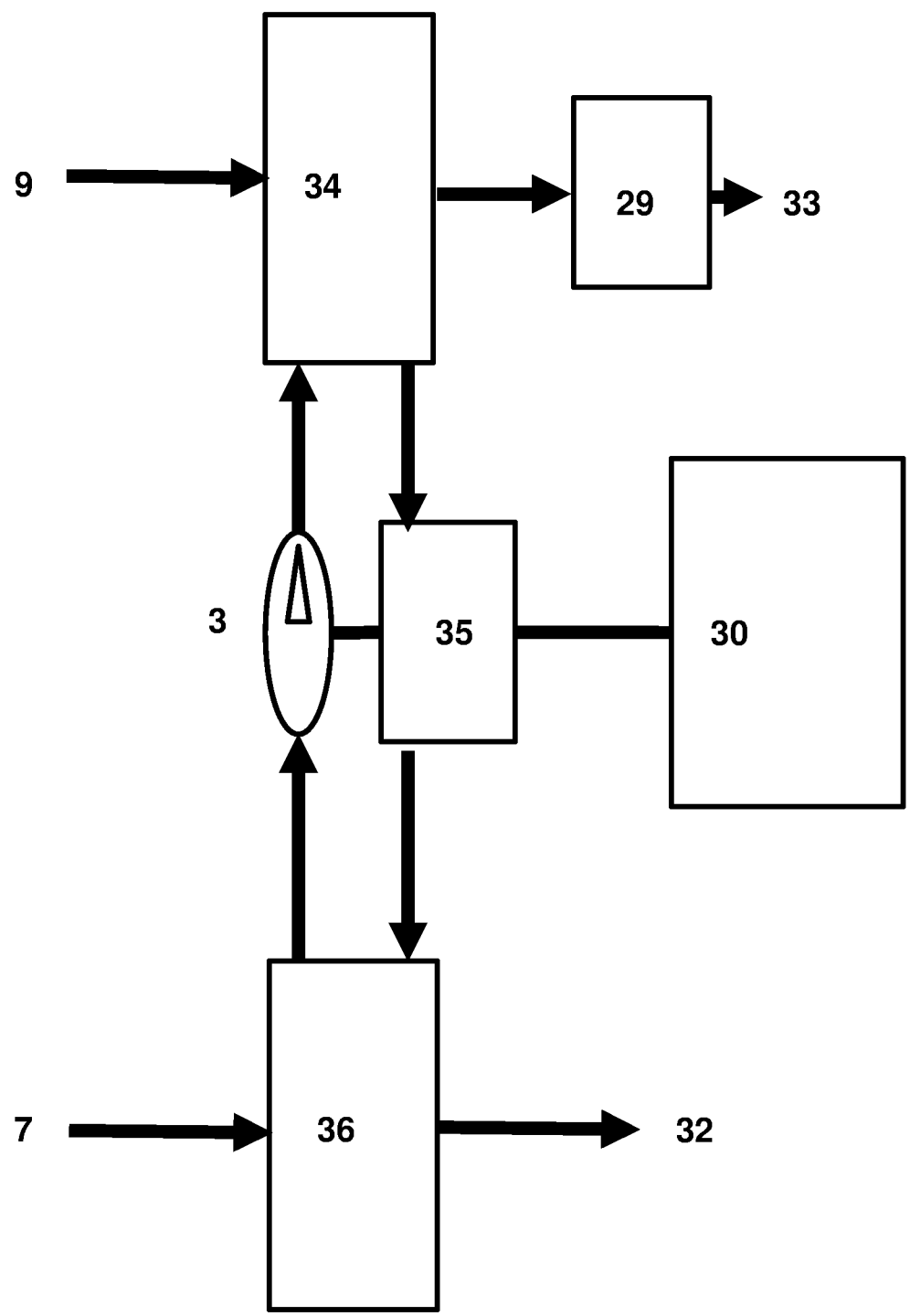
FIG. 8 shows a steam engine comprising a boiler to which exhaust gases from the furnace are supplied.

FIG. 8 illustrates a steam engine 35 comprising a pressurized boiler 34 heated by exhaust gas 9 from the furnace 2. Line 32 for withdrawal of water, control valves 25 and 26, and fan 28 are provided as further described in FIG. 7. A check valve 29 is provided to prevent ambient water to flood the furnace 2. A pressurized condenser 36 and feed water pumps 3 recirculate condensed water to the boiler 34. A generator/ECU 30 is provided to convert engine shaft energy to electric energy. The generator 30 may store energy for short period high output and for starting. The generator 30 also provides control and power to the arc heater, the aluminium wire processing, pump 3, valves 25, 26, and the EGR fan 28. An EGR may also be omitted provided the metal surfaces of the heater are coated with ceramics or other material resisting temperatures in the same range.

Figure 9:
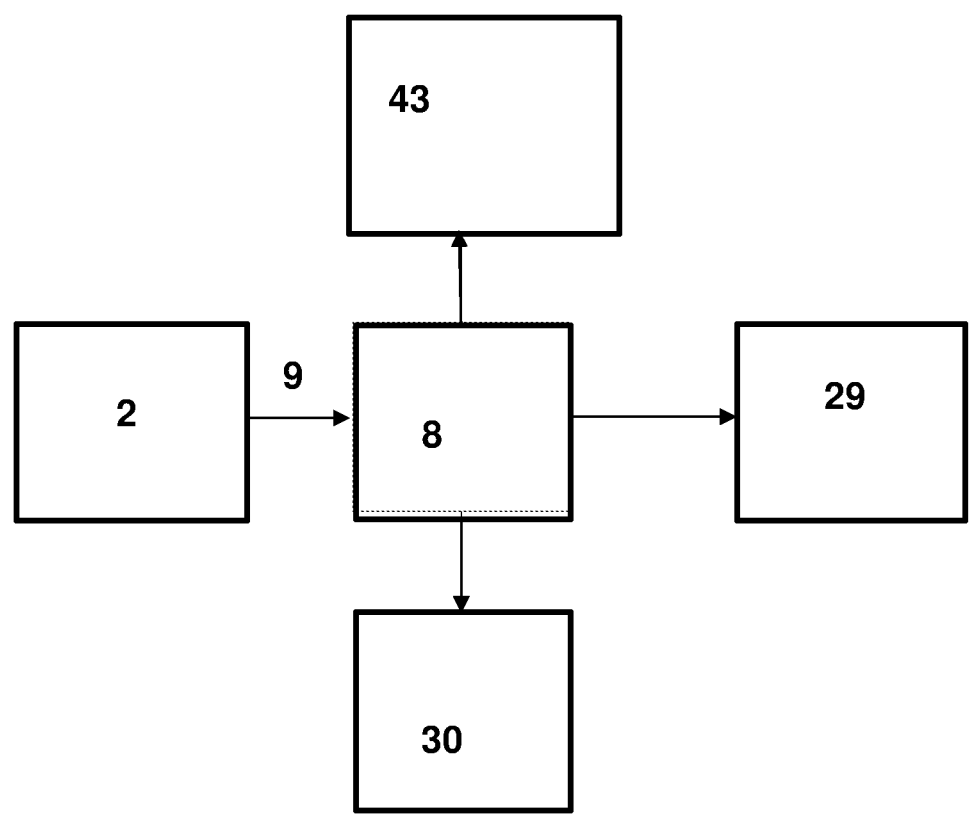
FIG. 9 shows a gas engine comprising a propeller shaft.

FIG. 9 shows a gas engine which receives pressurized exhaust gas 9 from the furnace 2 which gas is expanded upon supply to a propeller shaft 43. A generator battery (ECU) 30 and a check valve 29 are likewise connected to the engine.

The invention being thus described, it will be obvious that the same may be varied in many ways. Such variations are not to be regarded as a departure from the gist and scope of the present invention, and all such modifications as would be obvious to one skilled in the art are intended to be included within the scope of the claims.

The invention claimed is:

1. A method of combusting aluminium, the method comprises:
   i) feeding aluminium wire to a substantially oxygen-free furnace comprising:
      a. a first low-temperature section in communication with
      b. a second high-temperature section
   ii) forming aluminium particles with an average particle size ranging from 1 µm to 200 µm from said aluminium wire in said first section;
   iii) feeding water and/or steam to said first and/or second section to provide an oxidizer for oxidizing said aluminium particles in the second section;
   iv) conveying aluminium particles from the first section to the second section; and
   v) oxidizing said aluminium particles in the presence of steam in said second section, wherein the aluminium wire has a cross sectional area ranging from 0.1 to 50 mm$^2$.

2. The method according to claim 1, wherein aluminium particles are formed by:
   a) milling
   b) ultrasonic radiation
   c) intermixing steam and aluminium in a convergent-divergent nozzle; or
   d) rotary disc.

3. The method according to claim 1, wherein the formed aluminium particles range from 10 to 70 µm.

4. The method according to claim 1, wherein the aluminium wire is fed to said first section at a speed ranging from 1 to 300 g/second.

5. The method according to claim 1, wherein the temperature in the first low-temperature section ranges from 300 to 1000° C.

6. The method according to claim 1, wherein the temperature in the first low-temperature section ranges from 300 to 700° C.

7. The method according to claim 1, wherein the second high-temperature section is preheated to a temperature ranging from 1600 to 3500° C. before oxidation of aluminium particles is initiated.

8. The method according to claim 1, wherein a plasma arc controls the temperature in the furnace.

9. The method according to claim 8, wherein the plasma arc is switched off if the temperature is maintained within a predetermined range.

10. The method according to claim 1, wherein water and/or steam is fed to the furnace at a temperature ranging from 250 to 1100° C.

11. The method according to claim 1, wherein the pressure in the furnace ranges from 0.1 to 30 MPa.

12. The method according to claim 1, wherein the pressure in the furnace ranges from 1 to 3 MPa.

13. The method according to claim 1, wherein the furnace is equipped with a water jacket surrounding walls of the furnace to cool the furnace and maintain the oxidation temperature within a predetermined temperature range.

14. The method according to claim 1, wherein the retention time of aluminium in the furnace before oxidation ranges from 0.1 to 10 ms.

15. The method according to claim 1, wherein a heating barrier is provided between the low-temperature section and the high-temperature section of the furnace.

\* \* \* \* \*